(12) United States Patent
Duan et al.

(10) Patent No.: US 12,157,836 B2
(45) Date of Patent: Dec. 3, 2024

(54) PREPARATION METHOD OF OXIDIZED ANTICOAGULANT STARCH ADHESIVE

(71) Applicant: Hongsheng Technology (Beijing) Co., Ltd, Beijing (CN)

(72) Inventors: Zhongda Duan, Beijing (CN); Runda Yan, Beijing (CN)

(73) Assignee: Hongsheng Technology (Beijing) Co., Ltd, Beijing (CN)

( * ) Notice: Subject to any disclaimer, the term of this patent is extended or adjusted under 35 U.S.C. 154(b) by 354 days.

(21) Appl. No.: 17/071,948

(22) Filed: Oct. 15, 2020

(65) Prior Publication Data

US 2021/0024788 A1 Jan. 28, 2021
US 2021/0253916 A9 Aug. 19, 2021

(30) Foreign Application Priority Data

Aug. 16, 2019 (CN) .......................... 201910759465.8

(51) Int. Cl.
*C09J 103/02* (2006.01)
*C08L 3/06* (2006.01)
*C09J 103/06* (2006.01)

(52) U.S. Cl.
CPC ............... *C09J 103/02* (2013.01); *C08L 3/06* (2013.01); *C09J 103/06* (2013.01)

(58) Field of Classification Search
CPC .................................. C09J 103/06; C08L 3/06
See application file for complete search history.

(56) References Cited

U.S. PATENT DOCUMENTS 5,716,441 A * 2/1998 Nguyen ................. C09J 103/06
106/207.1
5,789,570 A * 8/1998 Buchholz ............... H01B 3/185
536/123

FOREIGN PATENT DOCUMENTS

CN 108018739 A * 5/2018

OTHER PUBLICATIONS

Machine Translation of CN-108018739-A, 2022 (Year: 2022).*

* cited by examiner

*Primary Examiner* — Liam J Heincer

(57) ABSTRACT

The present invention provides a preparation method of an oxidized anticoagulant starch adhesive, comprising the following steps: (1) an original starch and deionized water are mixed to form a starch emulsion, then the pH is adjusted to perform an oxidation reaction; a reductant is added to react with the unreacted oxidant, after the reaction is completed, an esterifying agent is added to perform an esterification reaction after adjusting pH; then a product is neutralized, washed, filtered and dried to obtain starch granules; and (2) a 40-50% starch emulsion is formulated by using the starch granules obtained in the step (1), the pH is adjusted to 6.5-7.5 after gelatinization, and dispersing agent, defoamer and water are added to form a starch adhesive. The esterifying agent used is composed of an anion and a cation, which significantly improves anticoagulant effect of the starch adhesive.

7 Claims, No Drawings

PREPARATION METHOD OF OXIDIZED ANTICOAGULANT STARCH ADHESIVE

CROSS REFERENCE TO RELATED APPLICATION

This application claims priority of the Chinese Patent Application filed on Aug. 16, 2019, with the application number of 201910759465.8, and the title of "Preparation Method of Oxidized Anticoagulant Starch Adhesive", the entire contents of which are fully incorporated herein by reference.

TECHNICAL FIELD

The invention relates to the technical field of adhesives, and in particular relates to a starch adhesive for carton.

BACKGROUND

Corrugated box is made from corrugated cardboard by shearing, indentation, nailing box or gluing box. Corrugated box is one of the most widely used packaging products, and the amount has always been the first of all kinds of packaging products. At present, corrugated box has become the most widely used packaging containers in modern packaging, and is one of the most important packaging forms used all over the world. The food industry, electronic appliance industry, beverage industry, machinery industry, pharmaceutical industry, daily chemical industry and other industries closely related to people's lives constantly launches new products, thus the number and variety of exports increases day by day, which greatly promotes the production of corrugated boxes as outer packaging products. These industry users not only have a large increase in the demand for cartons, but also put forward higher requirements for the moisture resistance, aesthetics, environmental protection and anti-wear of the carton. Adhesives are required for gluing corrugated boxes, the adhesives are viscous materials that connect the two separate materials by their adhesive properties.

SUMMARY OF THE INVENTION

The present invention provides a preparation method of oxidized anticoagulant starch adhesive, and the specific technical solution is as follows:

A method for preparing oxidized anticoagulant starch adhesive, comprising the following steps:

(1) an original starch and deionized water are mixed to form a 40-45% starch emulsion, then the pH is adjusted to 7-11 with sodium hydroxide, and oxidation reaction is carried out at 40-60° C.; after the oxidation reaction is completed, a reductant is added to react with the unreacted oxidant; after the reaction is completed, sodium bicarbonate is added to adjust the pH to 7-11, and an esterifying agent is added for esterification reaction; after the esterification, a product is neutralized with acid, washed with water, suction filtrated and dried to obtain starch granules.

(2) The starch granules obtained in step (1) are formulated into 40-50% starch emulsion, and the pH is adjusted to 6.5-7.5 after gelatinization, and an appropriate amount of dispersing agent, defoamer and water are added to form a starch adhesive.

Further, the original starch comprises at least one of corn starch, wheat starch, tapioca starch or potato starch;

Further, the oxidant used in the oxidation reaction includes at least one of hydrogen peroxide, sodium hypochlorite, and potassium permanganate;

Further, the reductant is at least one of sodium hydrogen sulfite, sodium sulfite, sodium sulfate, or ferrous sulfate;

Further, the formula of the esterifying agent is as follows,

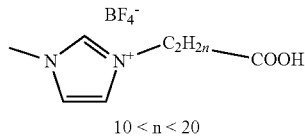

$10 < n < 20$

The esterifying agent is composed of an anion and a cation, wherein the cation is a methylimidazole substituted by a carboxyl-functionalized long-chain and the anion is tetrafluoroborate. On the one hand, the carboxyl functional group in the structure can be esterified with a hydroxyl group in corn starch to form a hydrophobic long-chain ester-based compound, and the ionic structure has a certain hydrophilic property, and the amphipathic property makes it have a good emulsifying property; on the other hand, tetrafluoroborate anion also has complexation property, can complex with oxygen-containing groups in starch, acts as a thickener, and also reduces complexation of starch molecules and tendency to agglomerate, thus increases its anticoagulant effect.

Further, the acid is at least one of hydrochloric acid, sulfuric acid, phosphoric acid or acetic acid;

Further, the dispersing agent is at least one of a non-ionic surfactant PE-6200, a surfactant Dyno160, and a wetting and dispersing agent CF-10;

Further, the defoamer is a mixture of an aqueous silicone defoamer (Q-119) and an oily silicone defoamer (DF-886), the mass ratio of the two is 1:1.

The invention has the beneficial effects of using a self-made ionic compound functionalized with carboxylic acid as an esterifying agent, which significantly improves anticoagulant effect of the starch adhesive. The starch adhesive prepared by the method has long storage period and good anticoagulant effect, and is particularly suitable for corrugated box adhesives.

DETAILED DESCRIPTION

There are many types of adhesives for adhesion of corrugated box, but starch adhesive is commonly used. Starch adhesive is a renewable natural polymer binder, which has been widely promoted because of its wide source, low price, non-toxic, odorless, environment-friendly and strong adhesion. Natural starches have better properties after physical or chemical modification and are widely used in the production of paper, labels and corrugated cardboard. Among the modified starches, oxidized starch adhesives occupy a considerable proportion. Natural starch is a high polymer with glucose its a structural unit, and has the disadvantages of high paste viscosity, poor fluidity and poor stability. After slight oxidation by the oxidizing agent, the hydroxyl group on the glucose structural unit is oxidized to the aldehyde group and the carboxyl group, and at the same time, the glycosidic bond between the molecular rings is partially broken, thus becomes an oxidized starch with a low degree of polymerization. Oxidized starch improves the disadvantages of low strength, short storage period and slow drying speed of gelatinized starch adhesives. However, the existing oxidized starch adhesive still has a problem of low capability of anti-coagulation and poor storage stability.

The present invention provides a preparation method of oxidized anticoagulant starch adhesive, and is further described below in conjunction with the embodiments, which are merely a part of the embodiments of the present invention. It is within the scope of the present invention to make equivalent substitutions or improvements by those skilled in the art based on the embodiments of the present invention without creative efforts.

Preparation of an esterifying agent:

In present invention, the esterifying agent is synthesized by the inventors, and the specific synthetic route includes a substitution reaction and an ion exchange reaction, take 3-dodecanoic acid-1-methylimidazolium tetrafluoroborate as an example, the specific scheme is as follows:

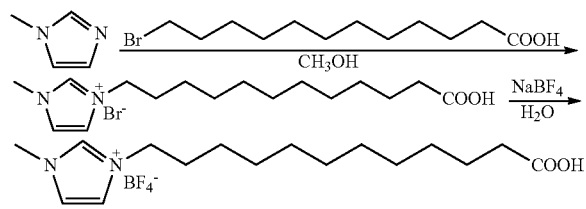

(1) 1-methylimidazole was mixed with 12-bromosodecanoic acid in a methanol solvent with a mole ratio of 1:1, the mixture reacted for 12 hours under reflux condition, the solvent was then evaporated to obtain 3-dodecanoic acid-1-methylimidazolium bromide;

(2) The bromide prepared in the step 1 was reacted with sodium tetrafluoroborate in an aqueous solution at room temperature for 24 hours, and then extracted with dichloromethane to obtain 3-dodecanoic acid-1-methylimidazolium tetrafluoroborate.

The 3-dodecanoic acid-1-methylimidazolium tetrafluoroborate prepared was analyzed by H NMR, and the results were as follows: $^1$H NMR (600 MHZ, DMSO) δ=1.3-2.2 (10×CH$_2$) 3.72 (CH$_3$), 5.1 (CH$_2$), 7.75 (CH), 7.92 (CH), 8.92 (CH), 11.87 ppm (OH).

Embodiment 1

A method for preparing an oxidized anticoagulant starch adhesive, comprising the following steps:

(1) corn starch and deionized water were mixed to form 40% starch emulsion 5 kg, then the pH was adjusted to 7-11 with sodium hydroxide, 120 g of 30% hydrogen peroxide was added at 45° C., an oxidation reaction was carried out under vigorously stirring, the pH value was maintained at 7-11 during oxidation process; after 30 minutes of the oxidation reaction, a reductant sodium hydrogen sulfite was added, the amount of the reductant added is to ensure that the reaction solution will not make color change of the starch potassium iodide test paper as the end point; after the reaction is completed, sodium bicarbonate was added to adjust the pH to 7-11, and 3-dodecanoic acid-1-methylimidazolium tetrafluoroborate was added for esterification reaction; after the esterification, the pH of product was adjusted with hydrochloric acid to neutral, and washed with water, suction filtered and dried to obtain starch granules.

(2) The starch granules obtained in step (1) were formulated into 4 kg of 45% starch emulsion, and after gelatinization, the pH was adjusted to 6.5-7.5; then 60 g of surfactant Dyno 160, a mixture of aqueous silicone defoamer (Q-119, 20 g) and oily silicone defoamer (DF-886, 20 g) were added, the reaction solution was stirred at 55° C. to obtain an anticoagulant starch adhesive.

Embodiment 2

A method for preparing an oxidized anticoagulant starch adhesive, comprising the following steps:

(1) corn starch and deionized water were mixed to form 40% starch emulsion 5 kg, then the pH was adjusted to 7-11 with sodium hydroxide, 40 g of sodium hypochlorite was added at 45° C., an oxidation reaction was carried out under vigorously stirring, the pH value was maintained at 7-11 during oxidation process; after 30 minutes of the oxidation reaction, a reductant ferrous sulfate was added, the amount of the reductant added is to ensure that the reaction solution will not make color change of the starch potassium iodide test paper as the end point; after the reaction is completed, sodium bicarbonate was added to adjust the pH to 7-11, and 3-tetradecanoic acid-1-methylimidazolium tetrafluoroborate was added for esterification reaction; after the esterification, the pH of product was adjusted with hydrochloric acid to neutral, and washed with water, suction filtered and dried to obtain starch granules.

(2) The starch granules obtained in step (1) were formulated into 4 kg of 45% starch emulsion, and after gelatinization, the pH was adjusted to 6.5-7.5; then 60 g of non-ionic surfactant PE-6200, a mixture of aqueous silicone defoamer (Q-119, 20 g) and oily silicone defoamer (DF-886, 20 g) were added, the reaction solution was stirred at 55° C. to obtain an anticoagulant starch adhesive.

Embodiment 3

A method for preparing an oxidized anticoagulant starch adhesive, comprising the following steps:

(1) wheat starch and deionized water were mixed to form 45% starch emulsion 5 kg, then the pH was adjusted to 7-11 with sodium hydroxide, 120 g of 30% hydrogen peroxide was added at 50° C., an oxidation reaction was carried out under vigorously stirring, the pH value was maintained at 7-11 during oxidation process; after 45 minutes of the oxidation reaction, a reductant sodium sulfite was added, the amount of the reductant added is to ensure that the reaction solution will not make color change of the starch potassium iodide test paper as the end point; after the reaction is completed, sodium bicarbonate was added to adjust the pH to 7-11, and 3-dodecanoic acid-1-methylimidazolium tetrafluoroborate was added for esterification reaction; after the esterification, the pH of product was adjusted with hydrochloric acid to neutral, and washed with water, suction filtered and dried to obtain starch granules.

(2) The starch granules obtained in step (1) were formulated into 4 kg of 45% starch emulsion, and after gelatinization, the pH was adjusted to 6.5-7.5; then 60 g of non-ionic surfactant PE-6200, a mixture of aqueous silicone defoamer (Q-119, 20 g) and oily silicone defoamer (DF-886, 20 g) were added, the reaction solution was stirred at 55° C. to obtain an anticoagulant starch adhesive.

Embodiment 4

A method for preparing an oxidized anticoagulant starch adhesive, comprising the following steps:

(1) tapioca starch and deionized water were mixed to form 40% starch emulsion 5 kg, then the pH was adjusted to 7-11 with sodium hydroxide, 50 g of potassium permanganate was added at 50° C., an oxidation reaction was carried out under vigorously stirring, the pH value was maintained at 7-11 during oxidation process; after 30 minutes of the oxidation reaction, a reductant ferrous sulfate was added, the amount of the reductant added is to ensure that the reaction solution will not make color change of the starch potassium iodide test paper as the end point; after the reaction is completed, sodium bicarbonate was added to adjust the pH to 7-11, and 3-hexadecanoic acid-1-methylimidazolium tetrafluoroborate was added for esterification reaction; after the esterification, the pH of product was adjusted with hydrochloric acid to neutral, and washed with water, suction filtered and dried to obtain starch granules.

(2) The starch granules obtained in step (1) were formulated into 4 kg of 45% starch emulsion, and after gelatinization, the pH was adjusted to 6.5-7.5; then 60 g of non-ionic surfactant PE-6200, a mixture of aqueous silicone defoamer (Q-119, 20 g) and oily silicone defoamer (DF-886, 20 g) were added, the reaction solution was stirred at 55° C. to obtain an anticoagulant starch adhesive.

Comparative Example 1 and Comparative Example 2

To demonstrate the effects of the present invention, for the above Embodiment 1 (Comparative Example 1), Embodiment 4 (Comparative Example 2), starch paste was prepared under the same formulation system with the esterifying agent prepared in present invention was replaced by common esterifying agent vinyl acetate, and the anticoagulant effect was compared. The relevant data is as described in Table 1.

TABLE 1

Comparison of anticoagulant properties of starch paste

| Samples | Serum volume ratio, 12 h | Serum volume ratio, 24 h | Serum volume ratio, 48 h | Serum volume ratio, 72 h | Serum volume ratio, 96 h |
|---|---|---|---|---|---|
| Embodiment 1 | 13 | 20 | 27 | 32 | 36 |
| Embodiment 2 | 14 | 21 | 27 | 33 | 37 |
| Embodiment 3 | 13 | 19 | 26 | 30 | 35 |
| Embodiment 4 | 12 | 18 | 25 | 30 | 34 |
| Comparative Example 1 | 16 | 26 | 42 | 53 | 61 |
| Comparative Example 2 | 15 | 24 | 41 | 50 | 59 |

It can be seen from the data in Table 1 that the starch paste formulated by the starch adhesive of the present invention has a good anticoagulant effect.

The above are only the preferred embodiments of the present invention, and are not intended to limit the present invention. Any modifications, equivalents, improvements, etc., which are within the spirit and scope of the present invention, should be included in the protection scope of the present invention.

What is claimed is:

1. A preparation method of oxidized anticoagulant starch adhesive, characterized by comprising the following steps:
   (1) mixing an original starch and deionized water to form a 40-45% starch emulsion, then adjusting pH value to 7-11 with sodium hydroxide, and performing an oxidation reaction at 40-60° C.; after the oxidation reaction is completed, adding a reductant to react with the unreacted oxidant; after the reaction is completed, adding sodium bicarbonate to adjust the pH to 7-11, and adding an esterifying agent for esterification reaction; after the esterification is finished, neutralizing a product obtained with acid, washing with water, suction filtrating and drying the product to obtain starch granules;
   wherein, the esterifying agent includes both a carboxyl functional group participating in the esterification reaction and a $BF_4^-$ having an associative thickening effect, and the esterifying agent comprises the following structural formula:

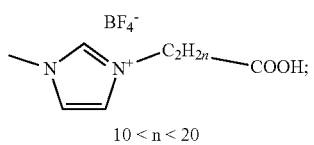

$$10 < n < 20$$

(2) formulating the starch granules obtained in step (1) into a 40-50% starch emulsion, performing gelatinization, and adjusting pH value to 6.5-7.5 after gelatinization, then adding a dispersing agent, a defoamer and water to form a starch adhesive.

2. The preparation method of oxidized anticoagulant starch adhesive according to claim 1, wherein, the original starch comprises at least one of corn starch, wheat starch, tapioca starch or potato starch.

3. The preparation method of oxidized anticoagulant starch adhesive according to claim 1, wherein, the oxidant used in the oxidation reaction includes at least one of hydrogen peroxide, sodium hypochlorite, and potassium permanganate.

4. The preparation method of oxidized anticoagulant starch adhesive according to claim 1, wherein, the reductant is at least one of sodium hydrogen sulfite, sodium sulfite, sodium sulfate, or ferrous sulfate.

5. The preparation method of oxidized anticoagulant starch adhesive according to claim 1, wherein, the acid is at least one of hydrochloric acid, sulfuric acid, phosphoric acid or acetic acid.

6. The preparation method of oxidized anticoagulant starch adhesive according to claim 1, wherein, the dispersing agent is at least one of a non-ionic surfactant, a surfactant, and a wetting and dispersing agent.

7. The preparation method of oxidized anticoagulant starch adhesive according to claim 1, wherein, the defoamer is a mixture of an aqueous silicone defoamer and an oily silicone defoamer, having a mass ratio of 1:1.

* * * * *